United States Patent [19]

Moen

[11] 4,183,376

[45] Jan. 15, 1980

[54] COLLAPSIBLE SLEEVE MIXING VALVE

[75] Inventor: Alfred M. Moen, Grafton, Ohio

[73] Assignee: Stanadyne, Inc., Windsor, Conn.

[21] Appl. No.: 837,428

[22] Filed: Sep. 28, 1977

Related U.S. Application Data

[63] Continuation-in-part of Ser. No. 677,323, Apr. 15, 1976, abandoned.

[51] Int. Cl.² .......................... F16K 11/02; F16K 7/07
[52] U.S. Cl. .............................. 137/625.17; 251/331; 251/318
[58] Field of Search .......................... 137/625.17, 853; 251/331, 61.1, 318, 358

[56] References Cited

U.S. PATENT DOCUMENTS

| | | | |
|---|---|---|---|
| 1,883,960 | 10/1932 | Koppel et al. | 251/331 X |
| 2,662,485 | 12/1953 | Ilfrey | 137/853 X |
| 2,902,049 | 9/1959 | Ilfrey et al. | 137/853 X |
| 3,103,231 | 9/1963 | Moen | 137/625.17 X |
| 3,190,312 | 6/1965 | Classen et al. | 251/331 X |
| 3,204,656 | 9/1965 | Moen | 137/625.17 X |
| 3,297,051 | 1/1967 | Church et al. | 137/625.17 |
| 3,730,222 | 5/1973 | Moen | 137/625.17 |

*Primary Examiner*—William R. Cline
*Attorney, Agent, or Firm*—Kinzer, Plyer, Dorn & McEachran

[57] ABSTRACT

A valve includes generally cylindrical sleeve means and a valve member reciprocally mounted within it. There is an inlet and an outlet in the sleeve means with movement of the valve member controlling the flow of water between said inlet and outlet. A flexible sleeve is positioned within the sleeve means and between the inlet and outlet. The flexible sleeve and valve member have cooperating surfaces forming a closure between the inlet and outlet.

18 Claims, 20 Drawing Figures

COLLAPSIBLE SLEEVE MIXING VALVE

SUMMARY OF THE INVENTION

The present invention relates to valves of the type generally shown in my prior U.S. Pat. Nos. 3,103,231 and 3,204,656. The present invention particularly relates to a mixing valve of this type using a flexible sleeve to control the volume and temperature of water passing through the valve and is a continuation-in-part of my copending application Ser. No. 677,323, filed Apr. 15, 1976, now abandoned.

One purpose of the invention is a mixing valve, insertable as a cartridge within a valve housing, and including a flexible sleeve positioned between a movable valve member and a stationary sleeve.

Another purpose is a valve member of the type described in which the flexible sleeve controlling passage of water from the valve inlet when the valve is in the open position, also provides a seal when the valve is in the closed position.

Another purpose is a valve member of the type described in which the flexible sleeve can be reversed when one end of the sleeve, normally used in forming a valve shutoff, becomes worn.

Another purpose is a valve utilizing a rubber sleeve of the type described which can be used to simply and efficiently control the passage of water from an inlet to an outlet.

Another purpose is a valve structure of the type described, functioning as a shutoff, to reliably control the passage of fluid therethrough.

Another purpose is a valve of the type described, functioning as a check valve, preventing back flow.

Another purpose is a valve having a pressure-assisted closing.

Another purpose is a control valve in which rotary handle motion is translated into reciprocal movement of a valve stem which moves inside of and controls the flow of water through a flexible sleeve member.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

As is described in the above-mentioned patents, the mixing valve of the present invention will customarily be positioned within a housing which is a permanent part of a plumbing installation. The movable valve member, or stem, will conventionally have a suitable operating member, either a lever or handle, for use in reciprocating and rotating the valve member to control the volume and temperature of water flowing through the valve. The valve finds application in kitchen faucets, lavatory faucets, shower installations and the like. The valve cartridge is a replaceable unit, thus permitting a faucet or shower installation to be quickly repaired by removing the faulty cartridge and replacing it with a new one.

Figure 1:
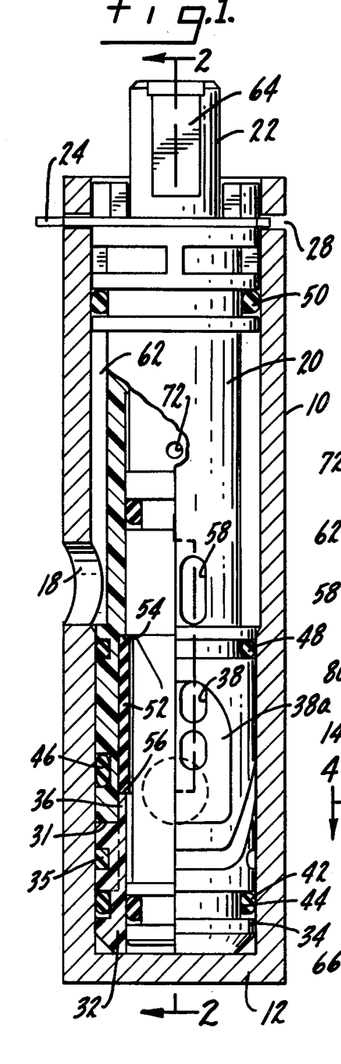
FIG. 1 is a partial axial section through a valve of the type described.

A valve housing is indicated at 10 and is shown to be generally cylindrical in form with a closed bottom 12. The housing will have a pair of inlet ports, indicated at 14 and 16, and an outlet port 18. The outlet may go to an attached spout or to a remote discharge, such as a spray or shower head.

Positioned within the housing 10 is the valve cartridge including a valve sleeve 20 and a valve member or stem 22, which is reciprocally and rotatably mounted within sleeve 20. The valve assembly made up of the sleeve and valve member is conventionally mounted within the housing 10 by means of a spring clip 24, the legs of which are positioned in slots 26 in the sleeve and pass through openings 28 in housing 10.

The sleeve 20 is open at the bottom or inner end, as indicated at 30, and mounts a sleeve tube 32 having a flange 34. The sleeve tube 32 extends within sleeve 20, as indicated at 36, and may preferably be formed of a plastic material providing relatively low friction to permit easy movement of stem 22 relative to the sleeve. The inner end of sleeve 20 has spaced axial notches 31 which receive projections 33 on sleeve tube 32. A snap ring 35 fits within a groove 37 on the exterior of sleeve 20, passing through grooves 39 on projections 33 to thereby lock the sleeve tube to the sleeve.

Spaced outwardly from the inner end of the sleeve are inlet groups 38 and 40 which are in register with housing inlets 14 and 16. The inner end of the sleeve may be sealed by an O-ring 42 positioned within a groove 44. A diagonal O-ring 46, positioned within a diagonal groove on the exterior of the sleeve is effective to prevent crossflow between hot and cold water ports 14 and 16. Such a diagonal O-ring is shown in the above-mentioned U.S. patents. An intermediate O-ring 48 forms a seal between the exterior of the sleeve and the interior of housing 10 outwardly of inlets 14 and 16. In like manner, the outer end of sleeve 22 carries an O-ring seal 50. The sleeve may preferably be formed of a suitable plastic material, although in some applications it may also be metallic.

Positioned within valve sleeve 20 is a flexible sleeve, for example a rubber sleeve, indicated at 52. A shoulder 54 formed on the interior of valve sleeve 20 positions one end of flexible sleeve 52 while the other end is contained or positioned by end 56 of sleeve tube 32. Thus, flexible sleeve 52 is positioned within valve sleeve 20 and at a location to mask sleeve inlet ports 38 and 40.

The sleeve inlets are associated with sleeve exterior recesses 38a and 40a, directly in communication with housing ports 14 and 16. Water moving into sleeve inlet ports 38 and 40 will be directed toward the flexible sleeve and will effect its partial collapse, which will permit the water to flow toward sleeve outlets 58. There may be two, three, four or more such outlets and they may be of varying size. The outlets open into an exterior chamber 62 formed between the interior of housing 10 and the exterior of sleeve 22, this chamber being in communication with the housing outlet port 18.

The stem or valve member 22 has an exterior portion 64 which will accomodate either a lever or handle. The far interior portion of stem 22 mounts an O-ring 66 within a groove 68 to seal the inner end of the stem to sleeve tube 32. An axially-extending passage 70 connects the inner end of the stem with atmosphere through a side passage 72 so that the stem is pressure-balanced, by atmospheric pressure, in both its open and closed positions.

Figure 4:
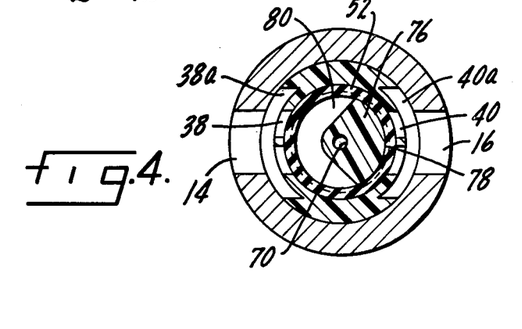
FIG. 4 is a section through the valve member.
Figure 5:
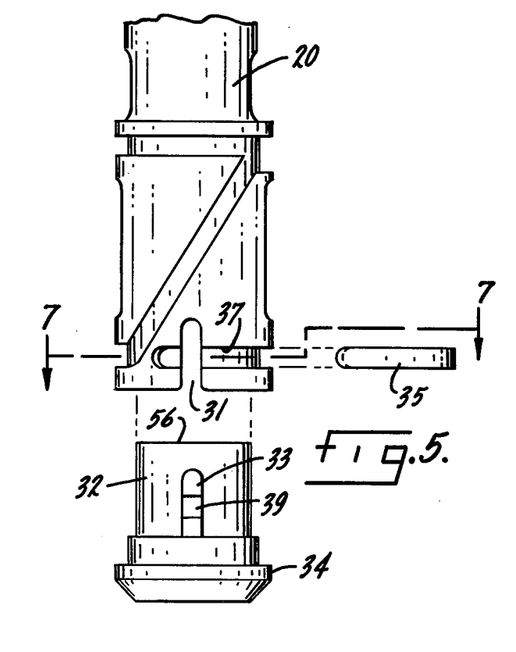
FIG. 5 is a partial exploded side view of the valve sleeve.
Figure 6:
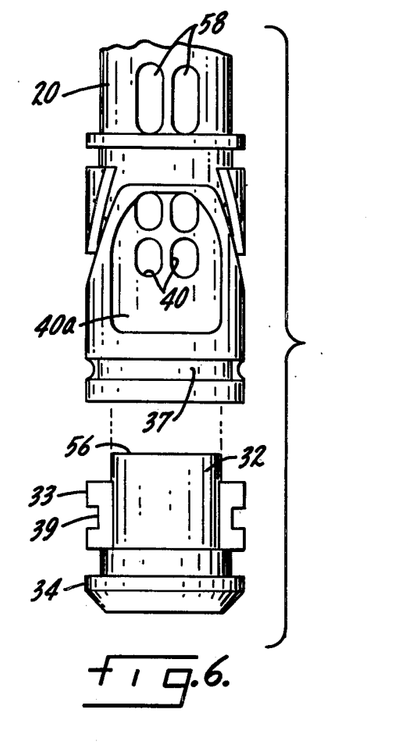
FIG. 6 is a further partial exploded side view of the valve sleeve, taken at 90 degrees to FIG. 5.
Figure 7:
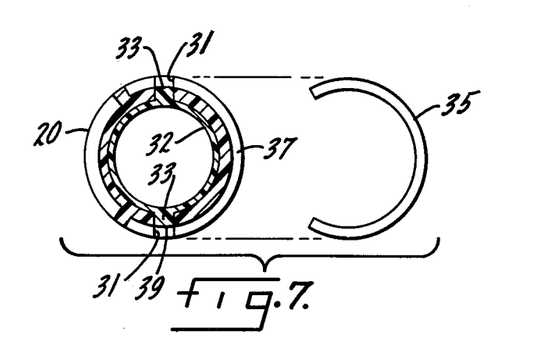
FIG. 7 is an exploded top sectional view of the valve sleeve bearing, taken along plane 7—7 of FIG. 5.

Directly above that portion of the stem carrying O-ring 66 is a cam member 76, shown particularly in FIG. 4. Cam member 76 has an exterior somewhat cylindrical surface 78 whose outer diameter is generally the same as the inner diameter of flexible sleeve 52. Cam member 76 extends an axial distance greater than that of flexible sleeve 52 so that it can be in contact with the interior surface of the flexible sleeve in all positions of the stem.

Figure 3:
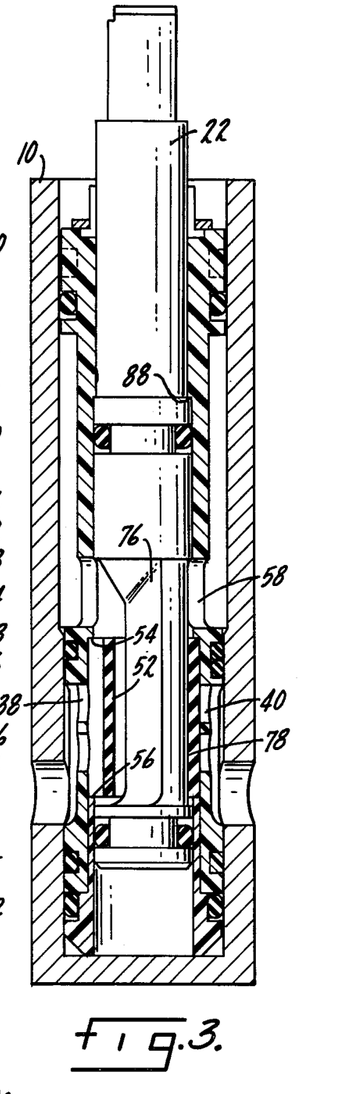
FIG. 3 is a vertical section, similar to FIG. 2, but showing the valve in an open position.

Cam section 76 defines an open area or recess 80 which will permit the inward flexing or collapsing of sleeve 52, as shown particularly in FIG. 3, so that water from the inlet can be passed between the inner surface of valve sleeve 20 and flexible sleeve 52 to sleeve outlets 58. Thus, the position of cam 76 relative to the inlet ports determines the volume and degree of mixing of water flowing from the inlet ports to the outlets.

Figure 2:
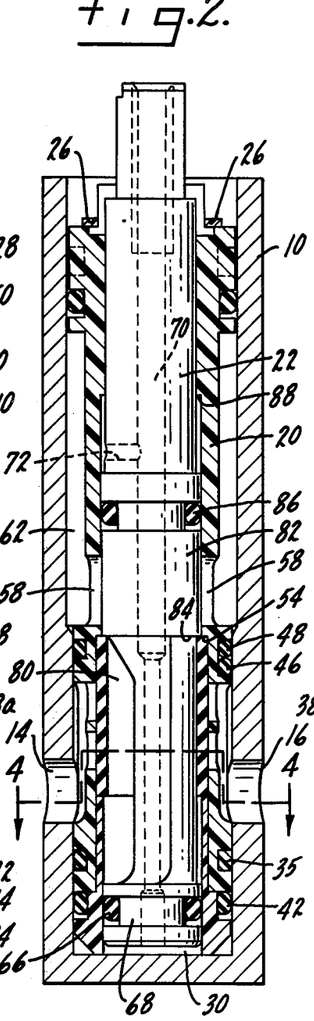
FIG. 2 is a section along plane 2—2 of FIG. 1.

Positioned outwardly of cam section 76 on stem 22 is a cylindrical portion 82 having generally the same outer diameter as the inner diameter of the valve sleeve and positioned to mask the valve sleeve outlets when in the closed position of FIG. 2. Note that in this position the lower edge 84 of cylindrical portion 82 is in sealing relation with the edge of flexible sleeve 52. Thus, sleeve 52 not only permits water to pass from the inlets, but forms a seal and closure with cylindrical stem portion 82 when the valve is in the closed position.

An O-ring 86 is positioned outwardly of cylindrical portion 82 and forms a seal with the interior surface of sleeve 20.

In operation, rotation of the valve member or stem will determine the degree of mixing of water from the hot and cold water ports and reciprocation will determine the volume of water passing to outlets 58. The position of cam section 76 relative to the two inlet ports determines the degree to which water is permitted to flow, by collapsing flexible sleeve 52, as particularly indicated in FIG. 3. When the valve is in the full closed position of FIG. 2, the inner surface 84 of cylindrical portion 82 of the stem is in sealing relation with the edge of flexible sleeve 52. When the valve is in the full open position, a shoulder 88 formed on the interior surface of valve sleeve 20 provides a stop for the valve member or stem.

Of particular advantage is the fact that the flexible sleeve 52 not only functions to control the passage of water through the valve when it is open, but also provides a seal with the stem when the valve member is in the closed position. The tube sleeve 32, preferably formed of plastic of a type having very low frictional resistance, insures that the stem will be easily rotated and reciprocated relative to the sleeve. Both the stem and the sleeve may be formed of plastic or they may be formed of metal.

An important aspect of the invention is the fact that the flexible sleeve is water pressure equalized in both the open and closed positions of the valve. In the open position, when the flexible sleeve collapses so that water may pass to the sleeve outlets, water is present both outside of the flexible sleeve and within it. In like manner, when the valve is closed, water flows within the flexible sleeve, due to the pressure upon the sleeve, from the sleeve inlets. However, there is no possibility of leakage, as the actual closure seal for the valve is formed by the cooperating surfaces on cylindrical portion 82 and the flexible sleeve.

An additional advantage for the particular construction of flexible sleeve shown and described is that since it is cylindrical, and therefore has identical ends, the sleeve may be reversed in the event that one end becomes worn due to closure of the valve stem upon it. A reversal of the sleeve effectively renews the entire valve structure.

Although the utility of the valve structure has heretofore been described in connection with a mixing valve, it should be clear that the principles disclosed are equally applicable to both a non-mixing type faucet and to a faucet structure which does not utilize the "cartridge" principle. Looking particularly at FIG. 8, a faucet of the kitchen type includes hot and cold water conduits 90 and 92 passing within an escutcheon plate 94. Conduits 90 and 92 are connected to a housing structure 96 having a cavity 98. Mounted upon the outer portion of housing structure 96 is a spout construction consisting of a cylinder 100 and an integral spout 102. A port 104 in cylinder 100 connects spout 102 with aligned ports 106 in the upper end of housing 96 through a circumferential passage 109.

Positioned within the top of housing 96 is a sleeve member 110 having an outwardly-extending flange 112 which overlies the upper end of housing 96. Sleeve 110 has a central bore 114 which is in alignment with cavity 98 and cooperates with the cavity to mount a reciprocal and rotatable valve stem 116. Sleeve 110 has ports 108 in alignment with passage 106. Valve stem 116 may be substantially the same as valve stem 22 described in connection with the valve of FIGS. 1–7 and mounts a cap 113 and a lever 115.

Figure 8:
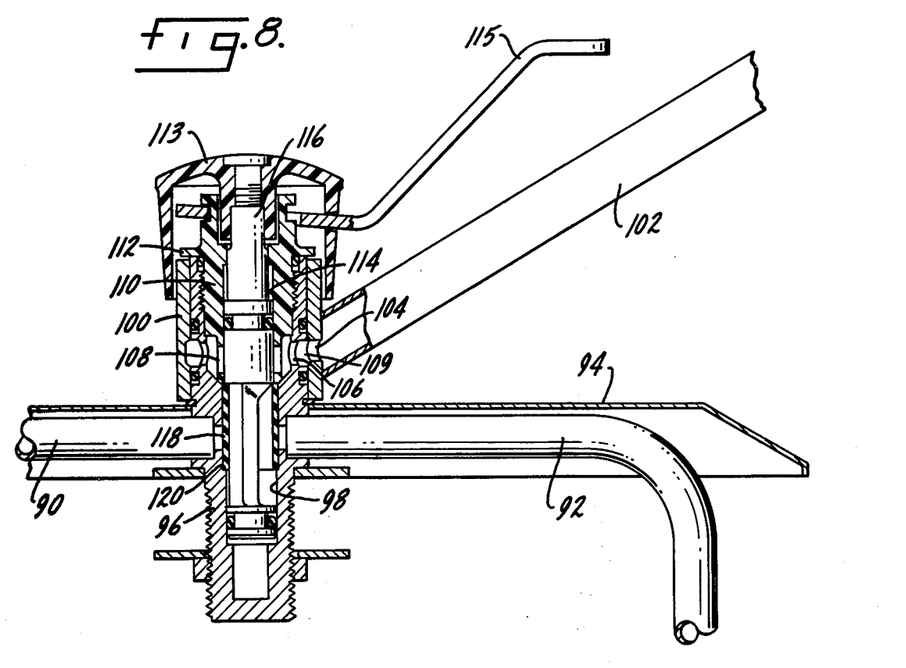
FIG. 8 is an axial section through a modified form of valve.

A flexible sleeve 118 is seated upon an annular shoulder 120 formed in housing 96, with the upper end of sleeve 118 cooperating with the valve stem in the manner heretofore described to provide a closure seal and shutoff for the faucet.

The operation of the structure of FIG. 8 is the same as that described in connection with the valve of FIGS. 1–7. The principal difference is that there is no insertable valve cartridge of the type heretofore described.

The flexible sleeve is directly positioned within the housing of the faucet.

Figure 9:
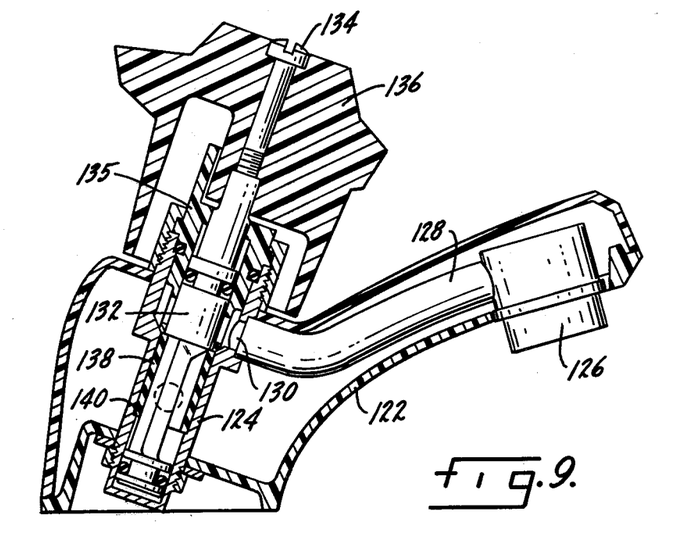
FIG. 9 is an axial section through a further modified valve member.

FIG. 9 shows the same principle applied to a lavatory faucet. In this case a housing body 122 mounts a cylindrical member 124, similar in interior configuration to housing 96 of FIG. 8. Housing 122 includes an integral spout 126 connected by a conduit 128 to a port 130 which opens into the cavity defined by member 124. Valve stem 132, which is the same as valve stem 116 in FIG. 8, is attached by means of a screw or the like 134 to a typical handle 136 which may be used to manipulate the stem so as to control the volume and temperature of water discharge through spout 126.

A flexible sleeve 138 is mounted within member 124 and seated upon a shoulder 140. A sleeve member 135, similar to member 110, is inserted within member 124. Again, the upper end of flexible sleeve 138 will cooperate with the cylindrical portion of the valve stem to form the appropriate seal and closure for the faucet. The operation of the structure of FIG. 9 is the same as that of FIG. 8 and of the valve disclosed in detail in FIGS. 1–7.

The valve construction of FIGS. 10–17 is useful for what is known as a two-handle faucet construction which may be utilized in a kitchen, bathroom, shower or the like. There are separate control valves for hot and cold water. The two valves will customarily feed a central spout or other type of discharge. Looking specifically at FIG. 10, a valve body 150, which may be formed of brass or the like, has a threaded exterior 152 for use in attaching the body to a conventional plumbing fitting. There may be an integral water discharge 154 which will pass water from the valve body to a centrally located spout. An escutcheon plate 156 covers a portion of the valve body and customarily provides the decorative outer area of the valve structure. A control knob 158, which may be formed of a variety of different metals or plastic materials, is attached by a screw 160 to a valve sleeve means 161. Knob 158 may have a recess 164 covered by a bezel cap 166, with screw 160 being positioned within the recess. The valve sleeve means may include a sleeve cam 162 forming the major portion of the sleeve means and a balance cup 196.

Figures 10, 11, 12, 13, 14, 15, 16, 17:
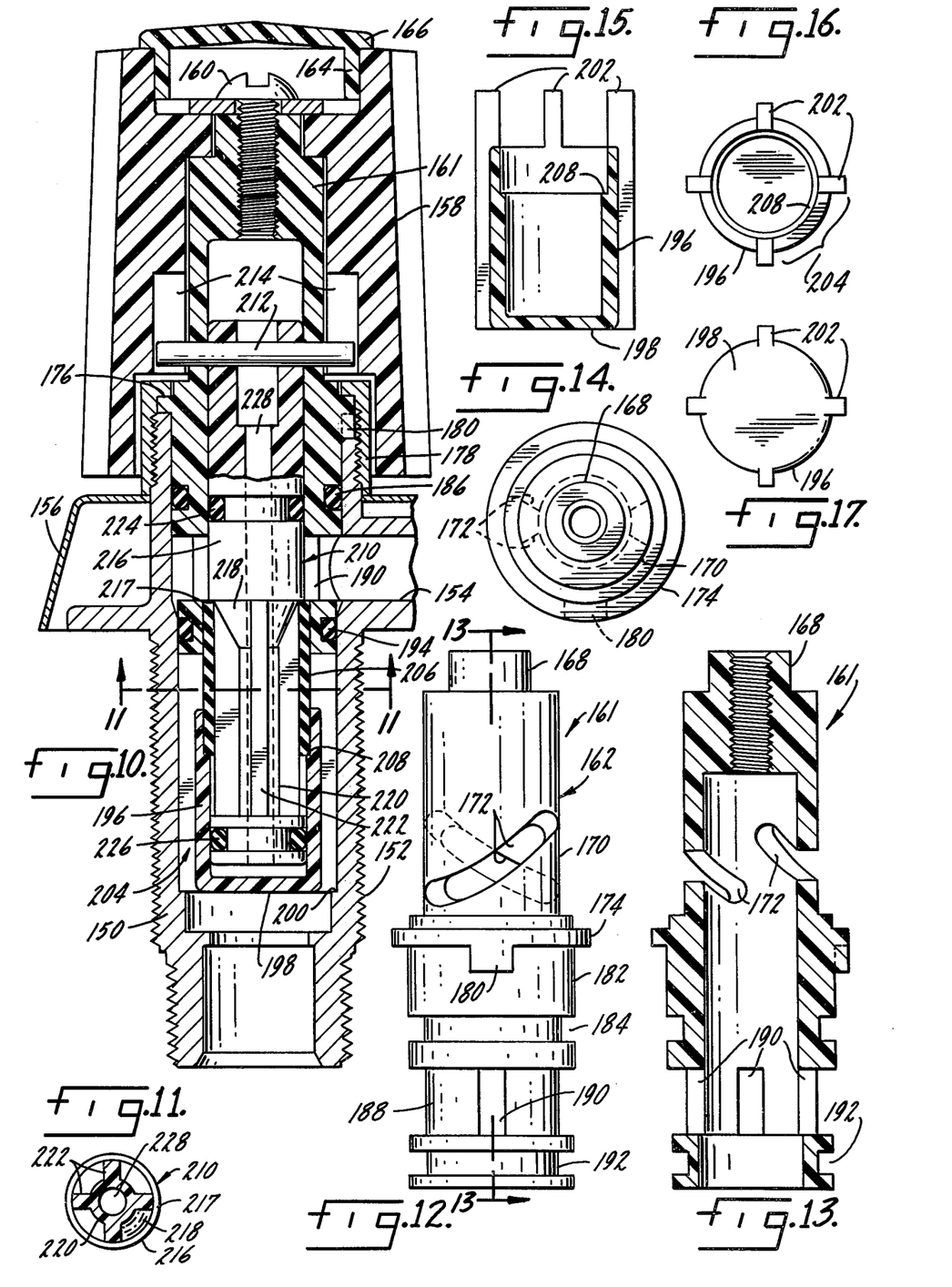
FIG. 10 is an axial section through yet a further modified form of valve construction.
FIG. 11 is a section of the stem along plane 11—11 of FIG. 10.
FIG. 12 is a side view of the valve sleeve member.
FIG. 13 is a section along plane 13—13 of FIG. 12.
FIG. 14 is a top view of the sleeve member.
FIG. 15 is an axial section through the balance cup forming a part of the valve sleeve means.
FIG. 17 is a bottom view of the balance cup.
FIG. 16 is a top view of the balance cup.

The sleeve cam 162 may include an upper cylindrical portion of reduced diameter 168 adjoining a larger cylindrical portion 170 having diammetrically opposed arcuate slots 172. Slots 172 are cam slots which translate the rotary motion of knob 158 into reciprocal motion of the valve stem as described hereinafter. Adjacent cylindrical portion 170 is an outwardly extending flange 174 which, when the valve is assembled, sits on top of upper surface 176 of body 150. A nut 178, shown particularly in FIG. 10, is threadedly attached to the upper end of body 150 and is used to hold the described sleeve structure in a fixed position. Directly adjacent flange 174 and integral with it is a downwardly-extending projection 180 which fits within a mating groove in the interior surface of body 150 to prevent relative rotation between the body and the sleeve structure. Also directly adjacent flange 174 is a further cylindrical portion 182 and an O-ring groove 184 containing an O-ring 186 which is in sealing relationship with the interior surface of body 150. Closely adjacent O-ring 184 is a cylindrical portion 188 of reduced diameter having a plurality, in this case four, generally uniformly spaced openings 190 which form the outlet ports from the sleeve structure and which are in register with discharge 154 on the body member, as particularly shown in FIG. 10. Directly adjacent openings 190 is a further seal ring groove 192 containing a seal ring 194 which bears against the interior surface of body 150 on the opposite side of its discharge from seal ring 186.

Balance cup 196 is shown particularly in FIGS. 15. The cup, along with sleeve cam member 162, may both be made of a suitable plastic. The balance cup is generally cylindrical in form and, when seated within body 150, has a lower closed surface 198 positioned upon a shoulder 200 in body 150. There are a plurality, for example four, outwardly and axially extending uniformly spaced vanes 202, each of which bear against the interior surface of body 150 and define axially extending water passages 204 therebetween. The upper ends of vanes 202 are positioned against the lower surface of sleeve cam 162 as the structure is assembled within body 150.

Positioned within the sleeve means comprising sleeve cam 162 and balance cup 196 is a flexible rubber sleeve, of the type described heretofore and indicated at 206. Sleeve 206 is supported within balance cup 196 by an interior shoulder 208 with the sleeve having an intermediate portion generally in register with the upper termination of passages 204, as shown particularly in FIG. 10.

Movable within the sleeve means and flexible sleeve 206 is a stem 210, which also may be formed of a suitable plastic material. Stem 210 at its upper end mounts a pin 212 which extends radially through the stem and into diammetrically opposed slots 172. Pin 212 also extends into axially extending slots 214 in diammetrically opposed areas of cap or knob 158. Thus, rotation of the knob, which causes rotation of pin 212, will effectively cause reciprocal movement of stem 210 as the pin moves within slots 172 in sleeve cam 162.

Stem 210 has a cylindrical portion 216 terminating in a shoulder 217 which cooperates with the flexible rubber sleeve 206 to form a closure for the valve as shown in connection with the previously-described forms of the invention. Directly adjacent cylindrical portion 216 is a frustoconic portion 218 and a portion of reduced diameter 220. The frustoconic portion 218 and the portion of reduced diameter 220 are positioned within flexible sleeve 206 when the valve is in the closed position of FIG. 10. The stem further has a plurality, for example, four uniformly spaced outwardly and axially extending projections 222 which bear against the interior surface of flexible sleeve 206. Projections 222 begin at shoulder 217 and are coextensive with cylindrical portion 220.

Stem 210 has upper and lower seal rings 224 and 226 positioned in suitable grooves and which bear against the internal surface of sleeve cam 162 and balance cup 196, respectively. The stem structure is completed by an axially extending air passage 228 which extends from the upper end of the stem down beneath seal ring 226 to the area defined by the bottom of the stem and bottom 198 of balance cup 196. Thus, there is atmospheric pressure on opposite ends of the stem and so it is pressure balanced in all positions of the valve.

In operation, water will flow inwardly from the bottom of body 150 and upwardly along the outside of balance cup 196 in passages 204. In the position of FIG. 10 the valve is closed, as the upper end of sleeve 206 is in contact with shoulder 217 of cylindrical stem portion 216. Although the water may to some degree force rubber sleeve 206 in an inward direction, water cannot flow upwardly past the described seal and into discharge 154. When knob 158 is rotated, causing the stem to rise through the described cam action, there will no longer be a seal at the described point between stem 210 and flexible sleeve 206. Thus, water will collapse the sleeve inwardly in the four described locations so that it may flow upwardly, about the outside of flexible sleeve 206, and then outwardly through discharge 154.

The flexible sleeve in the construction of FIGS. 10–17 operates in much the same manner as in the earlier-described forms of the invention in that there is a closure for the valve formed by the end of the flexible sleeve and a cooperating shoulder of the valve stem. The valve stem does not have the previously-described cam areas because the stem does not rotate to control the mixing of the fluid, but only reciprocates to control the volume of fluid passing through it.

One of the principal advantages of the valve structure described is that it prevents back siphonage or flow from the discharge area through the valve and into the water supply. In a large community in which there are literally millions of faucets attached to a common water supply, if any contamination from one such faucet were to reach the supply, the result would be contamination of the water used by a substantial number of individuals. When the valve is open it is impossible for water from the discharge, whether the discharge be a spout, a hose spray or anything of that nature, to reach the valve inlet because sleeve 206 will close passages 204 to water flowing from disharge 154.

Figure 18:
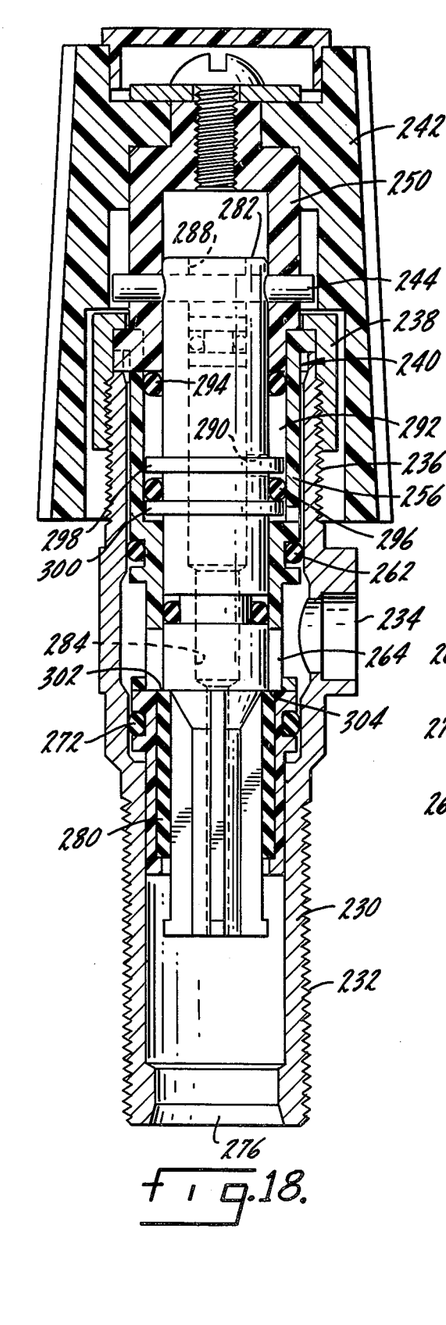
FIG. 18 is an axial section through still another modified form of valve structure.
Figures 19, 20:
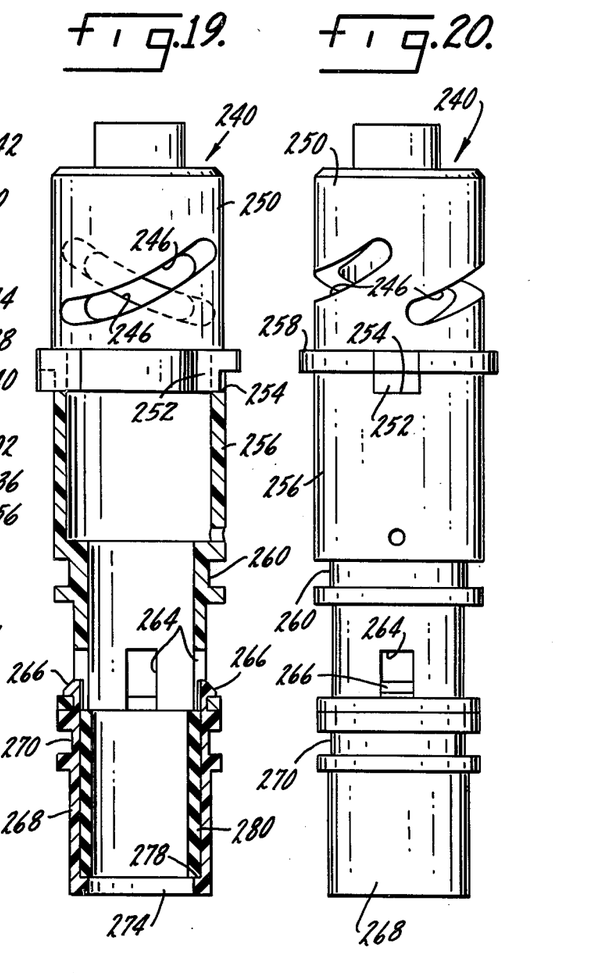
FIG. 19 is a partial axial section through the valve sleeve means of FIG. 18.
FIG. 20 is a side view of the valve sleeve means of FIGS. 18 and 19.

The structure in FIGS. 18, 19 and 20 also has utility in a double-handled faucet structure. It does not have means for preventing water from the discharge from reaching the valve inlet.

A valve body 230 again has a lower threaded area 232 for attachment of the body to a plumbing fixture. A discharge is indicated at 234 and a threaded area 236 is formed above the discharge 234 to secure a mounting nut 238 which in turn hold a sleeve structure 240 within the valve body. A knob 242 having a similar bezel cap is fastened to the upper end of the sleeve structure. There is again the combination of a pin 244 moving within aligned slots 246 in the upper end of the sleeve structure to translate rotary movement of knob 242 into reciprocal movement of the stem.

Looking specifically at the sleeve structure, there is a cam member 250 which contains slots 246 and which has opposed downwardly extending projections 252 which are received in mating notches 254 in the upper end of a sleeve member 256. As was the case with the structure of FIGS. 10–17, the overall sleeve structure may be formed of a suitable plastic as may the stem and knob.

Sleeve 256 has an upper outwardly extending annular flange 258 which functions in the same manner as flange 174 in the previously-described construction in that it serves to mount the sleeve structure within the body. Lock nut 238 with its inwardly extending flange will overlie flange 258 to thus hold the sleeve structure within the body. Intermediate the ends of sleeve 256 is an annular groove 260 mounting a seal ring 262 which bears against the interior surface of body 230. The lower end of sleeve 256 may have a series of notches 264 which receive hook-like projections 266 formed on the upper end of sleeve tube 268. Thus, the sleeve tube is attached to the lower end of sleeve 256 and along with the cam member 250 forms the overall sleeve structure. A groove 270 in sleeve tube 268 may contain an O-ring 272 which again is in sealing relationship with the interior surface of body 230. The lower end of sleeve tube 268 is open, as at 274, and this open end is in communication with the bottom inlet 276 of body 230. Thus, water entering the body will pass inside of the sleeve construction rather than outside of it as in the case of the FIG. 10 structure.

There is an annular shoulder 278 at the lower end of sleeve 268 which shoulder mounts a flexible sleeve 280 which may be similar to the flexible sleeves heretofore described.

Positioned within the described sleeve construction is a stem 282, the lower end of which may be identical to the stem described and shown in FIG. 10. The principal difference between stem 282 and stem 210 is the means for pressure balancing the stem in its open and closed positions. Stem 210 provided atmospheric pressure at opposite ends thereof by means of an axially directed passage 228.

The stem of FIG. 18 is pressure balanced in the same manner as disclosed in my prior U.S. Pat. No. 3,103,231. A water passage 284 is in communication with body inlet 276 and conveys water upwardly into the stem to an enlarged area 288. A radially-directed passage 290 permits water to pass to chamber 292, the opposite ends of which are defined by seal rings 294 and 296. Seal ring 296 is loosely captured between stem projections 298 and 300. The cross sectional area of stem 282 is generally equal to the cross sectional area of seal ring 296, thus providing equal and opposite water pressure forces to balance the stem in both its open and closed positions.

In operation, water at inlet 276 flows upwardly inside of flexible sleeve 280 toward the sealing point between the upper edge 302 of the flexible sleeve and a cooperating annular shoulder 304 on the stem. The sealing function is performed in the same manner as previously described. No water will pass the sealing point and thus no water will flow outwardly through body discharge 234. When the stem is reciprocated in an upward direction, by rotation of knob 242 in the manner previously described, water within flexible sleeve 280 will flow above sleeve 280, out through sleeve structure notches 264 and to discharge 234. There is no anti-siphon action because when the valve in in an open position, the flexible sleeve does not prevent water flow from discharge 234 to the inlet.

Whereas the preferred form of the invention has been shown and described herein, it should be realized that there may be many modifications, substitutions and alterations thereto.

The embodiments of the invention in which an exclusive property or privilege is claimed are defined as follows:

1. In a mixing valve, valve sleeve means having hot and cold water inlets and an outlet, a valve member mounted for reciprocation and rotation within said valve sleeve means to control the volume and temperature of water flowing from the inlets to the outlet, a flexible sleeve positioned within said valve sleeve means and masking the inside of said hot and cold water inlets, said outlet being axially beyond said flexible sleeve, means on said valve member selectively movable into register with portions of said flexible sleeve for controlling the passage of water from said inlets to the outlet, and cooperating means on said valve member and flexible sleeve for forming a closure between said inlets and outlet, including means on said valve member in contact with an end portion of said flexible sleeve when said valve member is in the closed position.

2. The structure of claim 1 further characterized by and including seal rings mounted on said valve member and in sealing contact with the interior surface of said valve sleeve means, said seal rings being positioned on opposite sides of said valve sleeve means inlets and outlet.

3. The structure of claim 1 further characterized in that the means on said valve member selectively movable into register with portions of said flexible sleeve includes an axially extending cam member, the outer surface of which is, at least in part, generally cylindrical and of generally the same diameter as the interior of said flexible sleeve.

4. The structure of claim 3 further characterized in that said axially extending cam member has a greater axial length than that of said flexible sleeve.

5. The structure of claim 1 further characterized by and including a shoulder on the inside surface of said valve sleeve means for positioning said flexible sleeve therewithin.

6. The structure of claim 1 further characterized in that said valve sleeve means includes a sleeve and a sleeve tube positioned at one end thereof, cooperating projections and grooves on said sleeve and sleeve tube for forming an interlock therebetween, and a lock ring positioned upon said sleeve and extending into said projections and grooves.

7. In a fluid valve, generally cylindrical sleeve means having inlet means and an outlet, a valve control member mounted for reciprocal movement within said sleeve means to control the flow of fluid from the inlet means to the outlet, a flexible sleeve positioned within said sleeve means and in register with the termination of said inlet means between said inlet means and outlet, said outlet being axially beyond said flexible sleeve, means on said valve member within said flexible sleeve for controlling the passage of water from said inlet means to the outlet, and cooperating means on said valve member and flexible sleeve for forming a closure between said inlet means and outlet including a generally cylindrical portion on said valve member terminating at one end thereof in a circumferential shoulder, said shoulder being in contact with an annular portion of said flexible sleeve when said valve is in the closed position.

8. The structure of claim 7 further characterized by and including an inwardly-directed annular shoulder formed on the interior surface of said generally cylindrical member, one end of said flexible sleeve being seated against said shoulder.

9. The structure of claim 7 further characterized in that said means on said valve member within said flexible sleeve for controlling the passage of water from said inlet means to the outlet is selectively movable into register with portions of said flexible sleeve.

10. The structure of claim 9 further characterized in that the means on said valve member selectively movable into register with portions of said flexible sleeve includes an axially extending cam member, the outer surface of which is, at least in part, generally cylindrical and of generally the same diameter as the interior of said flexible sleeve.

11. The structure of claim 7 further characterized in that said valve member includes, within said flexible sleeve, a plurality of axially extending grooves separated by axially extending vanes, with the exterior surface of said vanes being arranged for contact with the interior of said flexible sleeve.

12. The structure of claim 11 further characterized in that said grooves terminate at said circumferential shoulder.

13. The structure of claim 7 further characterized in that said sleeve means inlet means includes a plurality of axially extending passage means on the exterior of said sleeve means, said passage means terminating at a point in register with and intermediate the opposite ends of said flexible sleeve.

14. The structure of claim 13 further characterized in that said sleeve means includes a plurality of separable members, one of said members forming said axially extending passage means.

15. The structure of claim 7 further characterized in that said sleeve means inlet is at one end thereof, a plurality of axially extending passages in said valve member for controlling the passage of water from said inlet to the outlet, said axially extending passages being separated by axially extending projections in contact with an interior surface of said flexible sleeve.

16. The structure of claim 15 further characterized in that said axially extending passages terminate at said valve member circumferential shoulder.

17. The structure of claim 7 further characterized by and including cooperating cam means on said valve control member and sleeve means, said cam means including a member projecting outwardly from said valve control member and through a portion of said sleeve means.

18. The structure of claim 17 further characterized in that said projecting member is a pin extending outwardly through curved slots in said sleeve means.

* * * * *